United States Patent [19]
Iwasa

[11] Patent Number: 6,074,466
[45] Date of Patent: Jun. 13, 2000

[54] METHOD OF MANUFACTURING WATER BASE DISPERSE INK FOR INK-JET RECORDING

[75] Inventor: Youichi Iwasa, Fukui-ken, Japan

[73] Assignee: Seiren Co., Ltd., Fukui, Japan

[21] Appl. No.: 09/183,212

[22] Filed: Oct. 30, 1998

[30] Foreign Application Priority Data

Oct. 31, 1997 [JP] Japan .................................. 9-316458

[51] Int. Cl.[7] .................................................. C09D 11/02
[52] U.S. Cl. ..................................... 106/31.64; 106/31.65
[58] Field of Search ............................. 106/31.64, 31.65

[56] References Cited

U.S. PATENT DOCUMENTS

| | | | |
|---|---|---|---|
| 4,588,576 | 5/1986 | David | 423/608 |
| 4,693,879 | 9/1987 | Yoshimura et al. | 423/461 |
| 4,929,279 | 5/1990 | Hays | 106/412 |
| 5,059,249 | 10/1991 | Hays | 106/412 |
| 5,728,206 | 3/1998 | Bandejo | 106/493 |
| 5,741,356 | 4/1998 | Bandejo et al. | 106/493 |

*Primary Examiner*—Helene Klemanski
*Attorney, Agent, or Firm*—Flynn, Thiel, Boutell & Tanis, P.C.

[57] ABSTRACT

The method of manufacturing the water base disperse ink for jet-ink recording according to the invention comprises a series of steps (1) through (4), that is, (1) a step of purifying by washing pressed cakes composed of a water insoluble or slow soluble colorant; (2) a step of preparing a dispersion liquid with the colorant in high concentration by mixing the colorant obtained through purification by washing, and various additives for ink, as necessary, with an aqueous solution of the dispersant obtained by dissolving the water soluble dispersant in the water base dispersive vehicle; (3) a step of preparing separately a diluent composed of constituents of the dispersion liquid with the colorant in high concentration, excluding the colorant, and preparing an ink-like disperse liquid through dispersion after mixing the diluent with the dispersion liquid with the colorant in high concentration; and (4) a step of obtaining the water base disperse ink, in an evenly dispersed and stable condition, by subjecting the ink-like disperse liquid to ultrasonic irradiation treatment such that secondary aggregations of particles of the colorant contained in the ink-like disperse liquid are reduced to primary particles as much as possible.

8 Claims, No Drawings

METHOD OF MANUFACTURING WATER BASE DISPERSE INK FOR INK-JET RECORDING

BACKGROUND OF THE INVENTION

1. Field of the Invention

The invention relates to ink for ink-jet printing, and more particularly, to a method of manufacturing a water base disperse ink for jet-ink recording, containing a water insoluble or slow soluble colorant, a water soluble dispersant, and a water base dispersive vehicle as essential constituents thereof The water base disperse ink for jet-ink recording of the invention can be applied to any recording medium such as paper, cloth, and so forth, having receptivity for any water base disperse ink, and the method of 0manufacturing the same according to the invention is suited for application when manufacturing a variety of water base disperse inks containing a colorant in widely different concentration, which is required in the case of printing a pattern on a cloth, diverse in color strength.

2. Description of the Related Art

A water base disperse ink for jet-ink recording, using a water insoluble or slow soluble colorant, has the advantage over ink using a water soluble colorant in that bleeding of color is less, distinct recorded images can be formed, and images can be printed on a wide variety of recording media. This is the reason why various research and development on this subject has so far been promoted.

The water base disperse ink for jet-ink recording is generally manufactured by dispersing a pigment or a disperse dye, typical of a water insoluble or slow soluble colorant, in high concentration, into a water base dispersive vehicle (water) with the use of a dispersion apparatus such as a ball mill, sand mill, roll mill, speed line mill, homogenizer, sand grinder, or the like, diluting a dispersion liquid (dispersion liquid containing a colorant in high concentration) thus obtained with about 1 to 10 parts of a diluent, turning the same into an ink-like liquid with addition of various additives, and passing the same through a filter.

It is generally required of ink for ink-jet recording that any change in physical properties does not occur thereto during storage, clogging of ejection nozzles does not occur, and color strength and chroma of printed images are high. It is further required among other things from the viewpoint of productivity that the ink is manufactured efficiently.

It is to be pointed out that the water base disperse ink is far from satisfactory in respect of reliability since problems have often been occurred with it in particular that the dispersion liquid has undergone change in material properties over time after manufacturing owing to the inherent property thereof, that is, a colorant contained therein being water insoluble or slow soluble, causing gradual deterioration (coagulation-sedimentation) in dispersion condition of the colorant, and clogging of the ejection nozzles has resulted.

It is essential to maintain dispersion of the colorant in an even and very stable condition in order to ensure sufficient reliability.

One of conceivable measures for achieving a stable dispersion condition is to increase an amount of water soluble dispersant added so that surface activity acting between particles of the colorant and the water base dispersive vehicle by the agency of the water soluble dispersant can be further enhanced.

However, from the viewpoint of securing ejection characteristics of the nozzles, it is necessary to keep the viscosity of the ink at a given level or lower, and this requires an amount of the water soluble dispersant added to be controlled at the lowest possible level.

The water soluble dispersant has thus been faced with needs for satisfying contradictory requirements, and it has been extremely difficult to meet the both requirements at the same time.

Meanwhile, a method of manufacturing a pigment ink having a steep grain size distribution curve whereby a dispersion liquid after milling is diluted by adding various additives thereto, and fine-dispersion is again applied thereto by use of a high pressure homogenizer, as disclosed in Japanese Patent Laid-open Publication No. H 8-209045, has been proposed as means for achieving an even and stable dispersion condition represented by a steep colorant grain size distribution curve without containing coarse colorant particles.

The manufacturing method described is characterized by the use of a high-pressure homogenizer whereby a dispersive vehicle containing a colorant, disperant, and the like is caused to pass through micro-orifices at a high speed under high pressure in order to achieve even dispersion, and consequently, a stable water base dispersion liquid having a steep grain size distribution curve is obtained because the larger the mass of a particle, the faster the particle is accelerated. However, this method is still less than satisfactory from the viewpoint of securing absolute reliability on a long term basis.

Clogging of the nozzles occurring with the elapse of many hours in use is attributable to the fact that particles of the water insoluble or slow soluble colorant are not dispersed in stable condition.

Further, in the case of diluting a dispersion liquid with a colorant in high concentration to manufacture a water base disperse ink with emphasis on enhanced productivity, if an attempt is made to improve productivity by adding a diluent (water base dispersive vehicle) and various additives for adjusting ink characteristics to the dispersion liquid with the colorant in high concentration, and diluting the same at a high dilution factor, the consistency of liquid will undergo a significant change upon dilution, and dilution coagulation (the so-called solvent shock) will occur, causing a problem that a water base disperse ink having a stable dispersivity can not be obtained due to deterioration in dispersivity.

A dilution factor at which the diluent is added to, and mixed with the dispersion liquid containing the colorant in high concentration to obtain a disperse ink is normally regarded to be on the order of 1 to 10 parts of the diluent at one dilution, and if production efficiency is to be enhanced by raising the dilution factor to 10 parts of the diluent or higher while holding back deterioration in dispersivity, dilution operation needs to be repeated several times.

Time required for executing such a process and complexity of the process for repeating the dilution operation constitute a major negative factor for improving production efficiency.

Although it seems possible to improve productivity by setting concentration of the colorant and dispersant, contained in the dispersion liquid with the colorant in high concentration, at higher levels, it then becomes necessary to raise the dilution factor, leading to eventuality of the dispersivity becoming lower due to the solvent shock. For avoiding this, the number of process steps for repeating dilution operation needs to be increased, and consequently, the proposed method does not contributes to enhancement in production efficiency.

SUMMARY OF THE INVENTION

It is therefore an object of the invention to provide a method of manufacturing a water base disperse ink for jet-ink recording, in an extremely stable condition, such that no clogging of nozzles will occur with the elapse of long hours after manufacturing.

Another object of the invention is to provide a method of manufacturing a water base disperse ink for jet-ink recording, having excellent productivity.

To this end, the invention adopts a manufacturing method comprising steps (1) through (4) described hereinafter.

More specifically, the invention provides the method of manufacturing a water base disperse ink for ink-jet recording, containing a water insoluble or slow soluble colorant, a water soluble dispersant, and a water base dispersive vehicle as essential constituents thereof and the method comprises the steps (1) through (4) described below:

(1) a step of purifying by washing pressed cakes composed of the water insoluble or slow soluble colorant;

(2) a step of preparing a dispersion liquid with the colorant in high concentration by mixing the colorant obtained through purification by washing, and various additives for ink, as necessary, with an aqueous solution of the dispersant obtained by dissolving the water soluble dispersant in the water base dispersive vehicle;

(3) a step of preparing separately a diluent composed of constituents of the dispersion liquid with the colorant in high concentration, excluding the colorant, and preparing an ink-like disperse liquid through dispersion after mixing the diluent with the dispersion liquid with the colorant in high concentration; and (4) a step of obtaining the water base disperse ink, in an evenly dispersed and stable condition, by subjecting the ink-like disperse liquid to ultrasonic irradiation treatment such that secondary aggregations of particles of the colorant contained in the ink-like disperse liquid are reduced to primary particles as much as possible.

In the step of purifying by washing (1), purification by washing may be continued until a suspension containing 5 wt % of the colorant has pH in the range of 4 to 10, and electric conductivity in the range of 0 to 0.2 mS/cm.

Further, in the step of preparing the ink-like disperse liquid (3), the dispersion liquid with the colorant in high concentration may be diluted with 5 to 600 parts of the diluent.

Still further, in the step (4), the ultrasonic irradiation treatment may be applied under conditions of frequency in the range of 5 to 30 kHz, amplitude in the range of 20 to 60 $\mu$m, and irradiation energy in the range of $10^5$ to $10^6$ J/liter.

DESCRIPTION OF THE PREFERRED EMBODIMENTS

Now, respective steps of a method of manufacturing a water base disperse ink for jet-ink recording according to the invention is hereinafter described in specific terms.

(1) A Step of Purifying Pressed Cakes Composed of a Colorant by Washing the Same;

In this step, a process of purification by washing is applied to the pressed cakes composed of a water insoluble or slow soluble colorant, and the like to remove impurities contained therein.

Impurities formed at the time of synthesizing (by-products, and substances yet to react, or yet to be decomposed) and residues of neutralizers such as acid, alkali, salt, and so forth remain in a pressed cake composed of a water insoluble or slow soluble colorant such as pigment, disperse dye, and the like, and after purification by washing applied for removal of impurities, upon completion of synthesizing, the cake is put to market as a product colorant.

Although use of the product colorant, as it is, causes no inconvenience in most cases of application, the inventor et al have found out that trace of residual impurities, and residues of acid, alkali, salt, and so forth constitute a factor for deteriorating the stability of ink when the product colorant is used as a colorant in a water base disperse ink for ink-jet recording.

More specifically, it has been found as a result of intense study that by applying the process of purification by washing the product colorant until a suspension containing, for example, 5 wt % of the product colorant has come to have pH in the range of 4 to 10 and electric conductivity in the range of 0 to 0.2 mS/cm, a water base disperse ink having enhanced dispersion stability can be obtained.

The pressed cake composed of a water insoluble or slow soluble colorant is generally in the form of a dehydrated cake immediately after synthesis, and in a variety of conditions ranging from a powdery state to a slurry state, or a rubble state.

In the case of applying the process of purification by washing, the pressed cake is diluted with water beforehand, and the so-called repulping treatment whereby the colorant particles are reduced to about 1 mm or less in grain size is then applied thereto while mixing the same by use of a high-speed mixer in order to maximize purification efficiency.

Subsequently, an aqueous solution of the colorant substance is passed through a filter, forming a dehydrated cake layer for once.

Further, pure water is caused to pass through the cake layer, thereby washing away water soluble impurities remaining in voids within the cake layer with pure water.

Quality inspection is conducted by sampling from time to time at this stage of processing, and washing is terminated on the basis that a suspension (slurry) containing, for example, 5 wt % of the colorant has come to have pH in the range of 4 to 10 and electric conductivity in the range of 0 to 0.2 mS/cm.

Upon termination of washing, the cake layer is dewatered under reduced pressure.

A supplementary vibrator for dewatering whereby moisture is separated by causing the surface of a cake to be vibrated may be employed if necessary.

In the case where the cake is taken out after dewatering and stored, it is desirable to add an antiseptic, an antimyotic agent, and the like thereto, or introduce nitrogen gas thereto if necessary.

Any of well known and common inorganic pigments, organic pigments, disperse dyes, and the like can be used as a water insoluble or slow soluble colorant.

For example, carbon black, metal oxides, metal sulfides, and metal chlorides are cited among them.

Among carbon black, for example, furnace black, lamp black, acetylene black, channel black, and the like are cited.

Besides the above, the water insoluble or slow soluble colorants which can be used in the invention are: inorganic pigments such as titanium oxide, cadmium yellow, titanium yellow, zinc yellow, iron oxide red, cobalt blue, ultramarine, deep blue, guignet's green, and the like; organic pigments such as soluble azo pigment, insoluble diazo pigment, condensed azo pigment, pthalocyanine pigment, quinacridone pigment, isoindolin pigment, dioxazine pigment, perinone pigment, perilene pigment, thioindigo pigment, anthraquinone pigment, quinophthalone pigment, and the like; benzene azo disperse dyes based on mono azo, dis azo, naphthalene azo, and the like; heterocyclic azo disperse dyes based on thiazole azo, benzothiazole azo, quinoline azo, pyridone azo, imidazole azo, and nitrothiazole azo; anthraquinone disperse dye; and condensate disperse dyes based on quinophthalone, nitro, coumarin, methine, aminoketone, and the like.

The water insoluble or slow soluble colorants described in the foregoing can be used individually or in combination of two or more types.

With the manufacturing method according to the invention, ink containing the water insoluble or slow soluble colorant in widely varying concentration ranging from a high level to a very low level by adjusting use of the colorant such that the colorant content in a water base disperse ink as a finished product is in the range from maximum 5 wt % to minimum 0.001 wt %.

(2) a step of preparing a dispersion liquid with a colorant in high concentration, and (3) a step of producing an ink-like disperse liquid by adding a diluent to the dispersion liquid with the colorant in high concentration, and mixing both.

In the conventional method of manufacturing a water base disperse ink, a water base dispersion liquid (dispersion liquid with the colorant in high concentration) of a given concentration is prepared by dispersing a water insoluble or slow soluble colorant into a water base dispersive vehicle (water) with the use of a water soluble dispersant, various additives are added thereto such that various properties required of the water base dispersive vehicle and ink can be provided, and by diluting the water base dispersion liquid with a diluent, a water base disperse ink, a target finished product, is manufactured.

The additives described include a material property regulator for adjusting viscosity and surface tension, a wetting agent for inhibiting clogging of nozzles, and the like, but when the additives are added, a stable dispersion condition can collapse due to large difference in the consistency of ink, occurring between before and after addition of the additives, with the result that the colorant particles will sometimes undergo instantaneous shock coagulation caused, particularly, by change in pH, and change in composition of the dispersion liquid, and so forth.

As a result of the collapse (breakdown) of the dispersion condition, the colorant particles in the water base disperse ink will have a broad grain size distribution with the center of the distribution being shifted towards the side of larger grain sizes.

With the ink wherein a stable dispersion condition has collapsed, deterioration in the ink property will proceed with time.

Accordingly, the ink being ejected stably without causing clogging of nozzles at an initial stage of driving operation will cause clogging of nozzles before long after left unused for long time, eventually causing a problem that stable ejection of the ink becomes difficult.

As described hereinbefore, a solution to the problem described above therefore presents a major challenge to manufacturers of water base disperse ink.

This is a reason why the method of manufacturing a pigment ink, having a steep grain size distribution curve, has been proposed as means for preventing the breakdown of the stable dispersion condition as described hereinbefore, wherein after adding various additives, and like, fine-dispersion is again carried out by use of the high-pressure homogenizer. However, if the high-pressure homogenizer is used when a polymer based dispersant and the like are used for the dispersant, there will arise a possibility that deterioration of the dispersant itself, for example, severance of the main chain, is caused to occur owing to the strong shearing force of the homogenizer, preventing the dispersant to exhibit the primary function thereof for stability.

The manufacturing method according to the invention is characterized in that in preparing a dispersion liquid with a colorant in high concentration, and manufacturing a water base disperse ink as a target finished product by adding a diluent and various additives to the dispersion liquid subsequently, means are adopted whereby a diluent having chemical composition equal to that of the dispersion liquid with the colorant in high concentration, excluding the colorant, that is, a diluent consisting of the same constituents (preferably in the same concentration) as those of the dispersion liquid with the colorant in high concentration, except the colorant, is prepared such that the sum total of amounts of a dispersant and additives, contained in the dispersion liquid with the colorant in high concentration and amounts of a dispersant and additives such as a wetting agent, contained in the diluent used for dilution, represents concentration of respective constituents of the water base disperse ink as the target finished product, at appropriate levels, so that occurrence of shock coagulation (dilution-coagulation, the so-called solvent shock) caused by change in pH, and change in chemical composition and viscosity of the dispersion liquid, and the like is prevented, and the diluent thus prepared is then added to the dispersion liquid with the colorant in high concentration.

That is, in the step (2) of the invention for preparing the dispersion liquid with the colorant in high concentration, and the step (3) of the invention for producing the ink-like disperse liquid by adding the diluent to the dispersion liquid with the colorant in high concentration, and mixing both, the dispersion liquid with the colorant in high concentration is prepared by adding the water base dispersant, the water base dispersive vehicle, and additives for various types of inks to the colorant obtained by the step (1) of purification by washing, and subsequently, the diluent having the same chemical composition as that of the dispersion liquid with the colorant in high concentration, excluding the colorant, with concentration of the dispersant and the additives contained therein, adjusted so as to meet appropriate concentration levels of corresponding constituents of the water base ink as the target finished product, is added to the dispersion liquid with the colorant in high concentration for mixing and dispersion, thereby producing the ink-like disperse liquid.

Now, the steps (2) and (3) described above of the manufacturing method according to the invention will be described in more details hereinafter.

(A) In the Step (2) of Preparing the Dispersion Liquid Containing the colorant in high concentration, a water soluble dispersant is first dissolved in pure water (ion exchange water), producing an aqueous solution of the dispersant, and subsequently, the water insoluble or slow soluble colorant obtained through the step (1) of purification by washing is added to and mixed with the aqueous solution of the dispersant.

Mixing with the colorant is executed by normal means for mixing and agitation, for example, an agitator using an impeller, vibratory agitator, or the like.

Any of anionic, or nonionic water soluble dispersants, and water soluble resin dispersants, for common use in ink-jet application, may be used as the water soluble dispersant.

Representative anionic water soluble dispersants which can be used are: salts of lognin sulfonic acid, condensate between naphthalenesulfonic acid and formalin, condensate between alkylnaphthalenesulfonic acid and formalin, condensate between a particular aromatic sulfonic acid and formalin, condensate between creosote oil sulfonic acid and formalin, salts of the aforesaid condensates, and the like.

Representative nonionic water soluble dispersants which can be used are: block copolymer of ethylene oxide and propylene oxide, adduct of an alkyphenol with ethylene oxide, and the like.

Any of polymer dispersants having pigment dispersive capacity, for example, acrylic resin, may be used as the water soluble resin dispersant, including: styrene-acrylic acid copolymer, acrylic acid-acrylic acid alkyl ester copolymer, styrene-acrylic acid-acrylic acid alkyl ester copolymer, styrene-methacrylic acid copolymer, styrene-methacrylic acid-acrylic acid alkyl ester copolymer, styrene-α-methylstyrene-acrylic acid-acrylic acid alkyl ester copolymer, and salts of the aforesaid; polyacrylic acid salt, polymethacrylic acid salt, vinylnaphthalene-acrylic acid copolymer, styrene-maleic acid copolymer, maleic acid-maleic anhydride copolymer, vinylnaphthalene-maleic acid copolymer, and salts of the aforesaid; and the like.

The water soluble dispersant may further include: protein such as gelatin, albumin, casein, and the like; natural polymer such as gum arabic, and the like; and anionic polymer such as sodium salt, phosphate, and the like of formalin condensation product of β-naphthalenesulfonic acid.

The aforesaid water soluble dispersants may be used individually or in combination of two or more types.

An amount of the water soluble dispersants added represents preferably 0.1 to 15 wt % of a water base disperse ink for ink-jet recording as a finished product, and the amount thereof in the range of 0.5 to 10 wt % is particularly preferable.

Subsequently, additives for use in various inks are added to the aqueous solution of the dispersant mixed with the colorant.

It is desirable to add at first a wetting agent in solid or liquid form.

Representative solid wetting agents are: hydroxypropyl-β-cyclodextrin, trimethylolethane, trimethylolpropane, capro-lactum, urea, and the like; monosaccharide such as pentose, hexose, and the like; polysaccharides such as disaccharide, trisaccharide, and so forth, a derivative thereof, that is, sugar-alcohol; reduction derivative such as deoxy acid, and the like; oxide derivative such as aldonic acid, uronic acid, and the like; dehydrated derivative; amino acid; thiosugar; and the like.

Polyhydric alcohol of low volatility, having a high boiling point, is preferable as the solid wetting agent, including, for example: ethylene glycol, diethylene glycol, polyethylene glycol, propylene glycol, dipropylene glycol polypropylene glycol, triethylene glycol, polytriethylene glycol, hexylene glycol, tetra-ethylene glycol, polytetraethylene glycol, 1,3-butanediol, 1,5 pentanediol, glicerin, 1,2,6-hexanetriol, and the like.

The aforesaid wetting agents may be used individually or in combination of two or more types.

An amount of the wetting agents added represents preferably 0.1 to 15 wt % of the water base disperse ink for ink-jet recording as the finished product, and the amount thereof in the range of 0.5 to 10 wt % is particularly preferable.

Besides the above, a pH regulator, a chelating agent, a thickener, a fluidity improver, an electric conductivity regulator, an antiseptic, an antimycotic agent, an oxidation inhibitor, an ultraviolet radiation absorbent, an infrared radiation absorbent, a defoaming agent, and the like may be added if necessary.

Representative pH regulators which can be used in the invention are: organic amine such as diethanolamine, triethanolamine, and the like; inorganic base such as sodium hydroxide, potassium hydroxide, potassium hydrogenphosphate, and the like; organic acid; and mineral acid.

Subsequently, a liquid obtained by mixing the colorant and the additives with the aqueous solution of the dispersant is processed with various dispersing apparatus such as a ball mill, a sand mill, a roll mill, a speedline mill, a homogenizer, a sand grinder, and the like, producing the dispersion liquid with the colorant dispersed evenly in high concentration.

(B) Subsequently, the diluent having chemical composition equal to that of the dispersion liquid with the colorant in high concentration, excluding the colorant, that is, a diluent consisting of the same constituents (preferably in the same concentration) as those of the dispersion liquid with the colorant in high concentration, except the colorant, is prepared such that the sum total of amounts of the dispersant and the additives, contained in the dispersion liquid with the colorant in high concentration and amounts of a dispersant and additives such as a wetting agent, contained in the diluent used for dilution, represents concentration of respective constituents of the water base disperse ink as the target finished product, at appropriate levels, and the diluent thus prepared is added to the dispersion liquid with the colorant in high concentration.

For producing a water base disperse ink by diluting a dispersion liquid with a colorant in high concentration to a desired concentration of the colorant, the dispersion liquid with the colorant in high concentration is normally diluted with about 10 parts of a diluent at the maximum. However, with the manufacturing method according to the invention, means are adopted whereby a diluent having chemical composition of the dispersion liquid with the colorant in high concentration, excluding the colorant, that is, a diluent consisting of the same constituents as those of the dispersion liquid with the colorant in high concentration, except the colorant, is prepared, and the diluent is added to and mixed with the dispersion liquid with the colorant in high concentration in order to prevent occurrence of solvent shock (dilution-coagulation caused by change in pH, and change in chemical composition and viscosity of the dispersion liquid), producing an ink-like disperse liquid. As a result, it is possible to obtain a water base disperse ink in a stable state even if dilution is made with about 600 parts of the diluent at the maximum.

Consequently, the manufacturing method according to the invention, adopting the aforesaid steps, is suited for manufacturing a variety of water base inks containing a colorant in widely varying concentration, which is required particularly when printing a pattern with large difference in color strength.

In the case where the dispersion liquid of the invention is composed of a pigment, a wetting agent, a pH regulator, an antiseptic, and pure water, the diluent is composed of the wetting agent, the pH regulator, the antiseptic, and pure water.

The concentrations of the respective additives contained in the diluent are set, taking into account the concentrations of the respective additives contained in the dispersion liquid with the colorant in high concentration, such that a water base disperse ink as the target finished product will contain the additives in desired concentration, respectively.

It is desirable to add the diluent to the dispersion liquid with the colorant in high concentration at the time of dilution while agitating the latter.

It is further desirable to continue agitation for 5 to 20 minutes after completion of the dilution to eliminate localized unevenness in dispersion.

In the case of performing dilution by a high dilution factor of not less than 100, dilution to a desired concentration of the colorant, performed in two or three stages, will have no adverse effect on the finished product.

(4) a step of obtaining a water base disperse ink in an evenly dispersed and stable condition by subjecting the ink-like disperse liquid to ultrasonic irradiation treatment so that secondary aggregation of colorant particles contained in the ink-like disperse liquid are turned into primary particles as much as possible.

By applying ultrasonic irradiation to the ink-like disperse liquid obtained through the step (3) above of producing the ink-like disperse liquid, under conditions of frequency in the range of 5 to 30 KHz, amplitude 20 to 60 $\mu$m, and irradiation energy in the range of $10^5$ to $10^6$ J per liter, a stable and evenly dispersed water base disperse ink for ink-jet recording as the product intended can be manufactured.

In this step, particles of the water insoluble or slow soluble colorant are made uniform in grain size by applying a secondary dispersion treatment to the ink-like disperse liquid with the use of an ultrasonic homogenizer while turning the secondary aggregation of the colorant particles contained in the ink-like disperse liquid into primary particles as much as possible, thereby enabling the stable and evenly dispersed water base disperse ink to be manufactured.

The ultrasonic homogenizer has the advantage in that it can achieve pulverization and uniformity, which any mechanical mill can not do, and severance of the main chain of the dispersant as is often the case with a high speed mill does not occur because of adequate shear force thereof.

Presumably, the principle of such pulverization is based on the rupture of disperse substance by capillary liquid generated perpendicularly to the oscillation direction of ultrasonic waves (at the interface between the disperse substance and dispersive medium), or the effect of collision due to cavitation occurring at the contact surface between the oscillating plane of ultrasonic waves and process liquid. In any case, it can be said that the ultrasonic irradiation is a safe and gentle means for pulverization without being accompanied by strong shearing force as in the case of using a high pressure homogenizer.

The ultrasonic homogenizers which can be used in the invention are: continuous type model, US-1200T, manufactured by Nihon Seiki Co., Ltd. (frequency 20 KHz, maximum output 1200 W), continuous type, model 900, manufactured by Branson Ultrasonics Corp. (frequency 20 KHz, maximum output 900 W), and so forth. Good results are obtained by use of either of the equipment described above.

Frequency, amplitude, and irradiation time (calculated from irradiation energy required for 1 liter of the process liquid) are included among parameters for the ultrasonic irradiation, and since the lower the frequency is, the larger the chance of cavitation occurring becomes, the ultrasonic irradiation is to be applied preferably in the low frequency range of 5 to 30 kHz, more preferably, in the range of 10 to 25 kHz.

In case that the frequency is higher than 30 kHz, force of coagulation due to ultrasonic waves increases on the contrary, bringing about deterioration in dispersivity.

Also, since the larger the amplitude is, the higher the cavitation pressure becomes, the ultrasonic irradiation may be applied in the amplitude range of 20 to 60 $\mu$m.

The irradiation time required is calculated by the following formula:

$$SEC=E(J/liter) \times Q(J/liter)/ultrasonic\ output\ (W)$$

where SEC=irradiation time, E=required irradiation energy, and Q=amount of liquid processed.

After intense study, the inventor et al have found out that by applying the ultrasonic irradiation at required irradiation energy per unit volume of $10^5$ to $10^6$ J/liter, preferably, at $2 \times 10^5$ to $7 \times 10^5$ J/liter, the secondary particles can be effectively disintegrated without causing dilution-coagulation.

The ultrasonic irradiation can be applied by calculating the irradiation time at the time of actual ultrasonic treatment from the required irradiation energy described, an amount of liquid to be processed, and the ultrasonic output of the equipment in use.

If irradiation energy applied is too low, aggregation is disintegrated insufficiently, and if the same is too high, not only further enhancement in dispersion effect can not be anticipated, but also coagulation is caused to occur on the contrary due to rise in temperature of the process liquid.

Intense acoustic attenuation occurs in the liquid, and energy is converted into heat, leading to rise in the liquid temperature.

With rise in the liquid temperature, vapor pressure becomes higher, generating foams and thereby blocking propagation of ultrasonic waves. Also, this will eliminate numerous fine foams to constitute a nucleus of respective cavities, thus gradually decaying cavitation.

Further, it is desirable to assemble a cooling unit to an ultrasonic irradiation section because coagulation of particles due to heat starts to occur.

After the step of carrying out the secondary dispersion of particles of the water insoluble or slow soluble colorant, usual filtering treatment is applied by use of a filter, a super centrifugal filter, or the like.

With the use of, for example, a cartridge type in-line filter capable of precision filtering continuously, filtering treatment can be applied effectively as soon as the ultrasonic irradiation is completed.

Such filtering treatment enables hard and coarse particles which even dispersion by the mills and the secondary dispersion by ultrasonic waves have been unable to dispose of to be removed, contributing to further enhancement in the stability of the ink.

The invention will be described more specifically hereinafter with reference to embodiments of the manufacturing method according to the invention, and comparative examples.

[Embodiment 1]

Inspection of Feed Stock Colorant (Pressed Cake);

For inspection of a purification degree of C. I. Disperse Blue 165, as feed stock colorant, in a hydrated muddy cake condition, the same was diluted with pure water, preparing an inspection liquid containing 5 wt % of the same (solid portion). Subsequently, pH and electric conductivity of the inspection liquid were measured. The measurement results showed pH at 3.26, and electric conductivity at 0.32 mS/cm, whereupon inspection proceeded to the following step of purification.

Purification of a Colorant;

(Preparation of Colorant Slurry and Repulping)

For efficient purification of C. I. Disperse Blue 165, as feed stock colorant, in a hydrated muddy cake condition, colorant slurry was prepared by diluting C. I. Disperse Blue 165 with ion exchange water (pure water) so as to have the following composition.

| | |
|---|---|
| C. I. Disperse Blue 165 (solid portion 30%) | 33 wt % |
| pure water | balance |
| total | 100 wt % |

Subsequently, 300 Kg of the slurry described above was agitated by a large size high speed agitator for two hours, and colorant grain size was reduced to not more than about 0.5 mm, thereby preparing uniform slurry.

(Purification by Washing)

The slurry described above was passed through a filter, preparing a dehydrated layered cake for once, and the dehydrated cake was further passed through rinsing water (pure water), removing soluble impurities remaining in voids of the dehydrated cake.

An amount of pure water used for rinsing was 400 Kg per one cycle, and such rinsing was repeated for three cycles.

Thereafter, a rinsed cake was dewatered by use of sucking force, producing a dehydrated cake.

The dehydrated cake was diluted with pure water, preparing an inspection liquid containing 5 wt % of the dehydrated cake (solid portion). The results of measuring pH and electric conductivity of the inspection liquid showed pH at 6.6, and electric conductivity at 0.01 mS/cm, whereupon the purification step was completed.

(Preparation of a Dispersion Liquid with a Colorant in High Concentration)

After mixing a dispersant sufficiently with ion exchange water and dissolving the former into the latter, the colorant pressed cake purified by washing was added thereto for mixing by agitation, and wetting agents such as glycerin and diethylene glycol were added thereto, preparing a liquid mixed with the colorant as follows:

| | | |
|---|---|---|
| C. I. Disperse Blue 165 | (colorant) | 16 wt % |
| sodium salt of a condensate between naphthalenesulfonic acid and formalin (DEMOR N, DEMOR RN: produced by Kao Corp.) | (dispersant) | 5 wt % |
| glycerin | | 3 wt % |
| ethylene glycol | | 5 wt % |
| ion exchange water | | balance |
| total | | 100 wt % |

After crushing solids in the liquid mixed with the colorant described above in a sand mill by a wet process under condition of glass beads filling ratio at 70 volume % for 15 hours, and pulverizing the same, the glass beads were removed, preparing a dispersion liquid with the colorant in high concentration.

(Preparation of a Diluent)

The following diluent without the colorant contained was prepared.

| | | |
|---|---|---|
| sodium salt of a condensate between naphthalenesulfonic acid and formalin | (dispersant) | 5 wt % |
| glycerin | | 3 wt % |
| ethylene glycol | | 5 wt % |
| ion exchange water | | balance |
| total | | 100 wt % |

(Preparation of an Ink-Like Disperse Liquid)

The diluent described above was added to the dispersion liquid with the colorant in high concentration, and the latter was diluted with 10 parts of the former. Thereafter, agitation was continued for 20 minutes, thereby preparing an ink-like disperse liquid.

(Ultrasonic Irradiation)

The ultrasonic irradiation treatment was applied to the ink-like disperse liquid described above under the following processing conditions:

dispersing equipment Model 900 (made by Branson Ultrasonics Corp.)

| | |
|---|---|
| frequency | 20 kHz |
| amplitude | 40 μm |
| irradiation energy | 3.24 × 10 J/liter |
| (ultrasonic irradiation for 6 min. at output of 900 W/1 liter of ink) | |
| treatment method | continuous circulation type |

(low rate at 150 liters/h×15 passes) After the ultrasonic irradiation treatment, the ink-like disperse liquid was passed through a polypropylene cartridge filter (made by Toyo Roshi Kaisha, Ltd) with pores 5 μm in diameter, manufacturing a water base disperse ink for ink-jet recording.

[Embodiment 2]

A water base dispersant ink was manufactured in the same way as in Embodiment 1 except that an amount of rinsing water used in the step of purification by washing was 200 kgs, and a dehydrated cake of pH at 4.2 and electric conductivity at 0.18 mS/cm according to the result of inspection conducted upon completion of washing in the first cycle was used.

[Embodiment 3]

A water base dispersant ink was manufactured in the same way as in Embodiment 1 except that the following diluent was substituted for the same in Embodiment 1 (preparation of a diluent), and added to the dispersion liquid with the colorant in high concentration for dilution with 200 parts of the diluent (preparation of an ink-like disperse liquid);

(Preparation of a Diluent)

The following constituents without the colorant contained were mixed and diluted:

| | |
|---|---|
| sodium salt of a condensate between naphthalenesulfonic acid and formalin | 3 wt % |
| glycerin | 3 wt % |
| ethylene glycol | 5 wt % |
| ion exchange water | balance |
| total | 100 wt % |

[Embodiment 4]

A water base dispersant ink was manufactured in the same way as in Embodiment 1 except that the following processing was substituted for respective items under (preparation of a dispersion liquid with a colorant in high concentration), and (preparation of a diluent) in Embodiment 1;

(Preparation of a Dispersion Liquid with a Colorant in High Concentration)

| | |
|---|---|
| sodium salt of a condensate between aromatic sulfonic acid and formalin (DEMOR SN - B manufactured by Kao Co. Ltd.) | 14 wt % |
| EDTA (chelating agent) | 0.1 wt % |
| KH$_2$PO$_4$ (pH regulator) | 0.1 wt % |
| pure water (ion exchange water) | balance |
| total | 100 wt % |

An aqueous solution of a dispersant was prepared by mixing the constituents described above, and dissolving the same in water.

The cake of C. I. Disperse Blue 165, purified by washing as described in the foregoing, was added to the aqueous solution of the dispersant such that the former in terms of dried solid portion represents 9 wt %, and sufficient mixing was applied thereto by use of an agitator.

Subsequently, 2 wt % of glycerin and 7 wt % of ethylene glycol were added as wetting agents to the liquid described above, thereby preparing a liquid mixed with the colorant, and solids thereof were then crushed by the wet process in the sand mill, thus preparing a dispersion liquid with the colorant in high concentration.

(Preparation of a Diluent)

The following constituents were mixed, preparing a diluent:

| | |
|---|---|
| sodium salt of a condensate between naphthalenesulfonic acid and formalin | 5 wt % |
| EDTA (chelating agent) | 0.1 wt % |
| KH$_2$PO$_4$ (pH regulator) | 0.1 wt % |
| glycerin | 2 wt % |
| ethylene glycol | 5 wt % |
| ion exchange water | balance |
| total | 100 wt % |

[Embodiment 5]

A water base dispersant ink was manufactured in the same way as in Embodiment 1 except that the following diluent was substituted for the same in Embodiment 1 (preparation of a diluent), and added to the dispersion liquid with the colorant in high concentration for dilution with 550 parts of the diluent (preparation of an ink-like disperse liquid);

(Preparation of a Diluent)

The following constituents without the colorant contained were mixed and diluted:

| | |
|---|---|
| sodium salt of a condensate between naphthalenesulfonic acid and formalin | 2 wt % |
| glycerin | 3 wt % |
| ethylene glycol | 5 wt % |
| ion exchange water | balance |
| total | 100 wt % |

[Comparative Example 1]

A water base dispersant ink was manufactured in the same way as in Embodiment 1 except that the ultrasonic irradiation treatment was not applied.

[Comparative Example 2]

When diluting the dispersion liquid with the colorant in high concentration with 100 parts of a diluent, separate addition of the respective constituents composing the diluent dedicated for such use to the dispersion liquid with the colorant in high concentration was substituted for use of the diluent described.

That is, a water base dispersant ink was manufactured in the same way as in Embodiment 3 except that after ion exchange water was added to the dispersion liquid with the colorant in high concentration, and agitated, 3 wt % of sodium salt of a condensate between naphthalenesulfonic acid and formalin, 3 wt % of glycerin, and 5 wt % of ethylene glycol were added thereto in sequence, preparing an ink-like disperse liquid.

[Comparative Example 3]

A water base dispersant ink was manufactured in the same way as in Embodiment 1 except that the step of purification by washing was omitted.

[Comparative Example 4]

A water base dispersant ink was manufactured in the same way as in Embodiment 1 except that after adjusting beforehand the concentration of the dispersant in the dispersion liquid with the colorant in high concentration at a higher value given below instead of using the diluent dedicated for such application, ion exchange water, 8 wt % of sodium salt of a condensate between naphthalenesulfonic acid and formalin, 3 wt % of glycerin, and 5 wt % of ethylene glycol were added in sequence in order to prevent coagulation occurring when diluting with 10 parts of the diluent.

(Adjustment of the Dispersion Liquid with the Colorant in High Concentration)

| | | |
|---|---|---|
| C. I. Disperse Blue 165 | (colorant) | 8 wt % |
| sodium salt of a condensate between naphthalenesulfonic acid and formalin (DEMOR N, DEMOR RN: produced by Kao Co. Ltd.) | (dispersant) | 15 wt % |
| ion exchange water | | balance |
| total | | 100 wt % |

(1) Clogging of the Nozzles

Assessment was made on whether or not smooth ink-jet printing could be executed with ink filled in a cartridge, left unused for 6 months. Assessment was made in comparison with the initial condition before leaving the ink unused.

O: smooth printing was executed.

Δ: clogging occurred to a part of the nozzles.

X: clogging occurred to most parts of the nozzles, rendering printing impossible.

(2) Stability After Storage

O: no problem occurred.

Δ: occurrence of slight coagulation and change in viscosity were noticed.

X: significant coagulation of particles, and an increase in viscosity were noticed.

(3) Method of Ink-Jet Printing and Method of Assessing the Quality of Printed Images (a) Method of Ink-Jet Printing 1. ink-jet printer: Stemme type
2. voltage applied to the piezoelectric element: 150V
3. pulse width: 10 μs
4. driving frequency: 5000 Hz A commercially available paper for exclusive use in ink-jet printing was used as a recording medium for assessment, and the following images were printed thereon.

The printed images consisted of two patterns, 1) a square, 50×50 mm, and 2) a cross, 0.5 mm wide and 50 mm long, formed by two thin lines intersecting each other at right angles.

b) Method of Assessing the Quality of Printed Images

Visual assessment was made on the printed images obtained by the method described under a) above in the following manner:

surface color strength: visual survey on the pattern of 1) above was made on the following basis;
O: satisfactory
Δ: medium
X: insufficient bleeding: visual survey on the pattern of 2) above was made on the following basis;
O: no bleeding
Δ: medium
X: significant bleeding

[Table 1]

It is evident from the attached Table 1 that the dispersion stability of the ink according to the embodiments 1 through 5, obtained through a series of steps from the purification of a colorant by washing to the secondary ultrasonic dispersion via dilution with a diluent at a high dilution factor has been markedly improved in comparison with the ink according to the comparative examples 1 through 4 wherein some of the steps were omitted.

It is further shown that in the case of Comparative Example 2 wherein instead of using a diluent composed of a water base dispersion liquid, a water soluble dispersant, and additives as in Embodiment 1, ion exchange water was first added to a dispersion liquid with a colorant in high concentration, and subsequently, a water soluble dispersant and additives were added thereto in sequence, stability after storage deteriorated and printing quality was unsatisfactory while in the case of Comparative Example 3 wherein an attempt was made to prevent occurrence of coagulation at the time of dilution at a high dilution factor by setting the concentration of a dispersant in a dispersion liquid with a colorant in high concentration at a high value and by using pure water instead of a diluent, excessive permeation of the ink through printing paper took place although stability was improved, causing deterioration in color strength and much bleeding.

The method of manufacturing a water base ink for ink-jet recording according to the invention is advantageous in the following respects:

a) a water base ink for ink-jet recording can be manufactured efficiently because the concentration of a colorant can be set at a high value at the time of dispersion;

b) a water base ink for ink-jet recording having excellent stability after storage can be manufactured with ease from one lot of undiluted dispersion liquid at a dilution factor in the wide range of 5 to 600;

c) a water base ink for ink-jet recording, having a steep grain size distribution curve and excellent stability after storage, and causing no clogging of nozzles when printing, can be obtained; and d) the water base ink manufactured by the method according to the invention has excellent properties of preventing bleeding and permeation through printing paper because an amount of a water soluble disperant added can be controlled at the minimum necessary level, thereby enabling images high in color strength to be recorded.

TABLE 1

| | clogging of nozzle | | storage | printing quality | |
|---|---|---|---|---|---|
| | initial | 6 months | stability | color strength | bleeding |
| Embodiment 1 | O | O | O | O | O |
| Embodiment 2 | O | O | O | O | O |
| Embodiment 3 | O | O | O | O | O |
| Embodiment 4 | O | O | O | O | O |
| Embodiment 5 | O | O | O | O | O |
| Example 1 | Δ | X | Δ | Δ | Δ |
| Example 2 | O | X | X | Δ | Δ |
| Example 3 | O | X | X | Δ | Δ |
| Example 4 | O | Δ | Δ | X | X |

What is claimed is:

1. A method of manufacturing a water base disperse ink for ink-jet recording, containing a water insoluble or slow soluble colorant, a water soluble dispersant, and a water base dispersive vehicle as essential constituents thereof;

said method comprising the following steps (1) through (4):
(1) a step of purifying by washing pressed cakes composed of the water insoluble or slow soluble colorant;
(2) a step of preparing a dispersion liquid with the colorant in high concentration by mixing the colorant obtained through purification by washing, and various additives for ink, as necessary, with an aqueous solution of the dispersant obtained by dissolving the water soluble dispersant in the water base dispersive vehicle;
(3) a step of preparing separately a diluent composed of constituents of the dispersion liquid with the colorant in high concentration, excluding the colorant, and preparing an ink-like disperse liquid through dispersion after mixing the diluent with the dispersion liquid with the colorant in high concentration; and
(4) a step of obtaining the water base disperse ink, in an evenly dispersed and stable condition, by subjecting the ink-like disperse liquid to ultrasonic irradiation treatment such that secondary aggregations of particles of the colorant contained in the ink-like disperse liquid are reduced to primary particles as much as possible.

2. A method of manufacturing a water base disperse ink for ink-jet recording according to claim 1, wherein in the step (1) of purifying by washing, purification by washing is continued until a suspension containing 5 wt % of the colorant has pH in the range of 4 to 10, and electric conductivity in the range of 0 to 0.2 mS/cm.

3. A method of manufacturing a water base disperse ink for ink-jet recording according to claim 1, wherein in the step (3) of preparing the ink-like disperse liquid, the dispersion liquid with the colorant in high concentration is diluted with 5 to 600 parts of the diluent.

4. A method of manufacturing a water base disperse ink for ink-jet recording according to claim 1, wherein in the step (4), the ultrasonic irradiation treatment is applied under conditions of frequency in the range of 5 to 30 kHz, amplitude in the range of 20 to 60 $\mu$m, and irradiation energy in the range of $10^5$ to $10^6$ J/liter.

5. A method of manufacturing a water base disperse ink for ink-jet recording according to claim 2, wherein in the step (3) of preparing the ink-like disperse liquid, the dispersion liquid with the colorant in high concentration is diluted with 5 to 600 parts of the diluent.

6. A method of manufacturing a water base disperse ink for ink-jet recording according to claim 2, wherein in the step (4), the ultrasonic irradiation treatment is applied under conditions of frequency in the range of 5 to 30 kHz, amplitude in the range of 20 to 60 $\mu$m, and irradiation energy in the range of $10^5$ to $10^6$ J/liter.

7. A method of manufacturing a water base disperse ink for ink-jet recording according to claim 3, wherein in the step (4), the ultrasonic irradiation treatment is applied under conditions of frequency in the range of 5 to 30 kHz, amplitude in the range of 20 to 60 $\mu$m, and irradiation energy in the range of $10^5$ to $10^6$ J/liter.

8. A method of manufacturing a water base disperse ink for ink-jet recording according to claim 5, wherein in the step (4), the ultrasonic irradiation treatment is applied under conditions of frequency in the range of 5 to 30 kHz, amplitude in the range of 20 to 60 $\mu$m, and irradiation energy in the range of $10^5$ to $10^6$ J/liter.

\* \* \* \* \*